(12) United States Patent
Perras et al.

(10) Patent No.: US 12,108,286 B2
(45) Date of Patent: Oct. 1, 2024

(54) QUALITY OF SERVICE ADAPTATION FOR PC5 REFERENCE POINT COMMUNICATION

(71) Applicant: InterDigital Patent Holdings, Inc., Wilmington, DE (US)

(72) Inventors: Michelle Perras, Montréal (CA); Saad Ahmad, Montreal (CA); Martino Freda, Laval (CA); Khalid Anwar, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 374 days.

(21) Appl. No.: 17/293,661

(22) PCT Filed: Nov. 15, 2019

(86) PCT No.: PCT/US2019/061600
§ 371 (c)(1),
(2) Date: May 13, 2021

(87) PCT Pub. No.: WO2020/102621
PCT Pub. Date: May 22, 2020

(65) Prior Publication Data
US 2022/0014973 A1  Jan. 13, 2022

Related U.S. Application Data

(60) Provisional application No. 62/768,386, filed on Nov. 16, 2018.

(51) Int. Cl.
*H04W 28/24* (2009.01)
*H04W 24/08* (2009.01)
*H04W 28/02* (2009.01)
*H04W 92/18* (2009.01)

(52) U.S. Cl.
CPC ........... *H04W 28/24* (2013.01); *H04W 24/08* (2013.01); *H04W 28/0268* (2013.01); *H04W 92/18* (2013.01)

(58) Field of Classification Search
CPC ... H04W 28/0268; H04W 28/24; H04W 4/40; H04W 16/28; H04W 24/08; H04W 28/02;
(Continued)

(56) References Cited

U.S. PATENT DOCUMENTS 5,898,668 A * 4/1999 Shaffer ............. H04M 15/8016
370/252
9,137,677 B2 * 9/2015 Wille ..................... H04W 24/00
(Continued)

OTHER PUBLICATIONS

Kristoffer Lidstrom et al. "A spatial QoS requirements specification for V2V applications," Intelligent Vehicles Symposium (IV), 2010 IEEE, Jun. 21, 2010, pp. 548-553, p. 548 Section II, p. 549-552 figs 1,2, Table I.

(Continued)

*Primary Examiner* — Phuc H Tran
(74) *Attorney, Agent, or Firm* — Flaster Greenberg P.C.

(57) ABSTRACT

A method and apparatus to address changes in quality of service in a communication link between two user equipment devices includes establishing the communication link between a first user equipment device and a peer user equipment device, where the communication link services an application executing on the first user equipment. The first user equipment device monitors a current quality of service on the communication link and detects a condition wherein the current quality of service may not be met. Adjusted configuration parameters for the application and new quality of service parameters for the communication link are determined. The adjusted configuration parameters are applied to the application and the new quality of service parameters are applied to the communication link.

17 Claims, 9 Drawing Sheets

(58) Field of Classification Search
CPC ... H04W 28/0263; H04W 4/02; H04W 4/029; H04W 4/38; H04W 4/44; H04W 4/46; H04W 4/50; H04W 48/16; H04W 64/003; H04W 76/14; H04W 8/005; H04W 92/18; H04L 1/0017; H04L 1/0023; H04L 41/0816; H04L 41/5025; H04L 43/08; H04L 43/16; H04L 47/24; H04L 67/12; H04L 67/61

See application file for complete search history.

(56) References Cited

U.S. PATENT DOCUMENTS

| | | | | |
|---|---|---|---|---|
| 2011/0149775 | A1* | 6/2011 | Lee | H04L 41/5067 370/252 |
| 2015/0199139 | A1* | 7/2015 | Faulkner | G06F 3/067 711/114 |
| 2021/0274387 | A1* | 9/2021 | Kousaridas | H04L 41/5045 |
| 2021/0329487 | A1* | 10/2021 | Wang | H04W 28/24 |

OTHER PUBLICATIONS

Retrieved from the Internet: URL:http://www.3gpp.org/ftp/Meetings%5F3GPP%5FSYNC/RAN1/Docs/R1%2D1813112%Ezip, Continental Automotive GMBH: "Discussion of Physical Layer Aspects of QoS Prediction for NR V2X" 3GPP Draft; R1-1813112, 3rd Generation Partnership Project (3GPP), Mobile Competence Centre; 650, Route Des Lucioles; F-06921 Sophia-Antipolis Cedex; France, vol. RAN WG1, No. Spokane, USA, Nov. 12, 2018-Nov. 16, 2018, Nov. 11, 2018, retrieved on Nov. 11, 2018.

"3rd Generation Partnership Project; Technical Specification Group Services and System Aspects; Study on architecture enhancements for EPS and 5G System to support advanced V2X services (Release 16)", 3GPP Standard; Technical Report; 3GPP TR 23.786, 3rd Generation Partnership Project (3GPP), Mobile Competence Centre ; 650, Route Des Lucioles ; F-06921Sophia-Antipolis Cedex ; France, vol. SA WG2, No. V0.9.0,Oct. 26, 2018 (Oct. 26, 2018), pp. 1-91.

Interdigital Inc: "Key Issue #15 Update and Solution for UEs connected via PC5 Interface", 3GPP Draft; S2-1812025 Solution to Key Issue 15, 3rd Generation-Partnership-Project (3GPP), Mobile Competence Centre ; 650, Route Des Lucioles ; F-06921 Sophia-Antipolis Cedex ; France, vol. SA WG2, No. West Palm Beach, FL, USA; Nov. 26, 2018-Nov. 30, 2018, Nov. 20, 2018 (Nov. 20, 2018), Retrieved from the Internet: URL:http://www.3gpp.org/ftp/Meetings%5F3GP P%5FSYNC/SA2/Docs/S2%2D1812025%2Ezip.

* cited by examiner

QUALITY OF SERVICE ADAPTATION FOR PC5 REFERENCE POINT COMMUNICATION

CROSS REFERENCE TO RELATED APPLICATIONS

This application claims the benefit, under 35 U.S.C. § 371 of International Application PCT/US2019/061600, filed 15 Nov. 2019, which claims the benefit of U.S. provisional patent application No. 62/768,386 filed 16 Nov. 2018, and which are incorporated by reference herein in their entirety.

FIELD

Embodiments disclosed herein generally relate to wireless communications. For example, they relate to quality of service adjustments for communications between user equipment devices.

BACKGROUND 5G communications systems can accommodate vehicle to vehicle (V2V) and vehicle to everything (V2X) communications. Multiple types of reference point interfaces are defined in 5G specifications. However, not all communication methods are defined. The present disclosure addresses a problem in V2X communications where a quality of service change is needed in a PC5 reference point interface between multiple user equipment (UE) executing a V2X application.

SUMMARY

This summary is provided to introduce a selection of concepts in a simplified form as a prelude to the more detailed description that is presented later. The summary is not intended to identify key or essential features, nor is it intended to delineate the scope of the claimed subject matter. Embodiments expressed in the various figures are related and the features therein may be combined unless otherwise stated.

In one example embodiment, a method performed by a first user equipment, such as a Wireless Transmit Receive Unit (WTRU), having a PC5 communication link with a peer WTRU, includes monitoring current Quality of Service (QoS) information associated with the PC5 communication link, detecting a condition wherein the current QoS may not be met in the future, determining or obtaining adjusted configuration parameters for an application running on the first WTRU based on the detection, applying the adjusted configuration parameters to the application, determining or obtaining new QoS parameters for the PC5 communication link based on the adjusted configuration parameters, and configuring the PC5 communication link to apply the new QoS parameters.

In an aspect of the method, determining or obtaining adjusted configuration parameters for the application may include at least one of determining or obtaining the adjusted configuration parameters by referencing a mapping table provisioned on the first WTRU, or requesting and receiving the adjusted configuration parameters from a server. Requesting and receiving the adjusted configuration parameters from a server may include sending, by the first WTRU to the server, an indication that the current QoS may not be met with determined or obtained QoS parameters and/or a prediction of a QoS that can be met, and receiving the adjusted configuration parameters for a V2X application from the server.

In an aspect of the method, determining or obtaining the new QoS parameters for the PC5 communication link may include at least one of determining or obtaining the new QoS parameters by referencing a mapping table provisioned on the first WTRU, or requesting and receiving the new QoS parameters from a server. In another feature of the method, monitoring current QoS information associated with the PC5 communication link may include monitoring QoS information on the PC5 reference point interface between vehicles executing a V2X application using at least one of a unicast transmission or a multicast transmission. In addition, monitoring the current QoS may include monitoring performance indicators of the current QoS. The act of detecting the condition wherein the current QoS may not be met in the future may include comparing performance indicators of the current QoS to thresholds. The act of determining new QoS parameters may include determining new QoS parameters that accommodate a different QoS than the current QoS.

In an aspect of the method, determining the adjusted configuration parameters for the application and the new QoS parameters for the PC5 communication link may include determining V2X application layer adjusted configuration parameters and new QoS parameters for an access stratum (AS) layer based on a determination at the V2X layer that the current QoS may not be met. In another aspect, the method may include communicating the adjusted configuration parameters and the detected condition that the current QoS may not be met from the first WTRU to the peer WTRU using the communication link. In another aspect, the method may include collecting history/context information from the peer WTRU by the first WTRU using the communication link.

In one example embodiment, a Wireless Transmit/Receive Unit (WTRU) includes a transceiver configured to communicate via a PC5 communication link between the WTRU and a peer WTRU. The PC5 communication link services an application executing on the WTRU. A processor of the WTRU is configured to monitor a current QoS on the PC5 communication link, detect a condition wherein the current QoS may not be met in the future, determine or obtain adjusted configuration parameters for the application based on the detection, apply the adjusted configuration parameters to the application, determine or obtain new QoS parameters for the PC5 communication link based on the adjusted configuration parameters, and configure the PC5 communication link to apply the new QoS parameters.

In an example embodiment, the PC5 interface may be configured to use one or more of unicast transmissions and multicast transmissions. In one aspect, the processor may be configured to monitor performance indicators of the current QoS on the PC5 communication link and to compare the performance indicators to thresholds to detect a condition where the QoS on the PC5 communication link may not be met. In another aspect, the processor may be configured to determine adjusted configuration parameters for the application by one of reference to a mapping table provisioned on the WTRU, or a request and reception of the adjusted configuration parameters from a server. In another aspect, the processor may be configured to determine new QoS parameters for the communication link by one of a reference to a mapping table provisioned on the WTRU, and a request and reception of the new QoS parameters from a server.

In an example embodiment, the processor is configured to determine adjusted configuration parameters and new QoS parameters for an AS layer based on the detection at a V2X layer that the current QoS of the AS layer may not be met. In one aspect, the transceiver may be configured to communicate the adjusted configuration parameters and the detected condition of the current QoS may not be met to the peer WTRU. In another aspect, the transceiver may be configured to collect history/context information from the peer WTRU.

In one embodiment, a computer readable storage medium includes instructions which when executed by a computer cause the computer to carry out the methods described in more detail herein.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein.

DETAILED DESCRIPTION

Example Networks for Implementation of the Embodiments

User equipment (UE) devices may be implemented in a robotic vehicle, automobile, IoT gear, any device that is mobile or stationary. UEs may also be a form of wireless transmit/receive units (WTRUs) or other communication device, which, in turn, may be used in a communication network. The following section description of example WTRUs and/or other communication devices is inclusive of UEs and networks in which they may be incorporated.

Figure 1A:
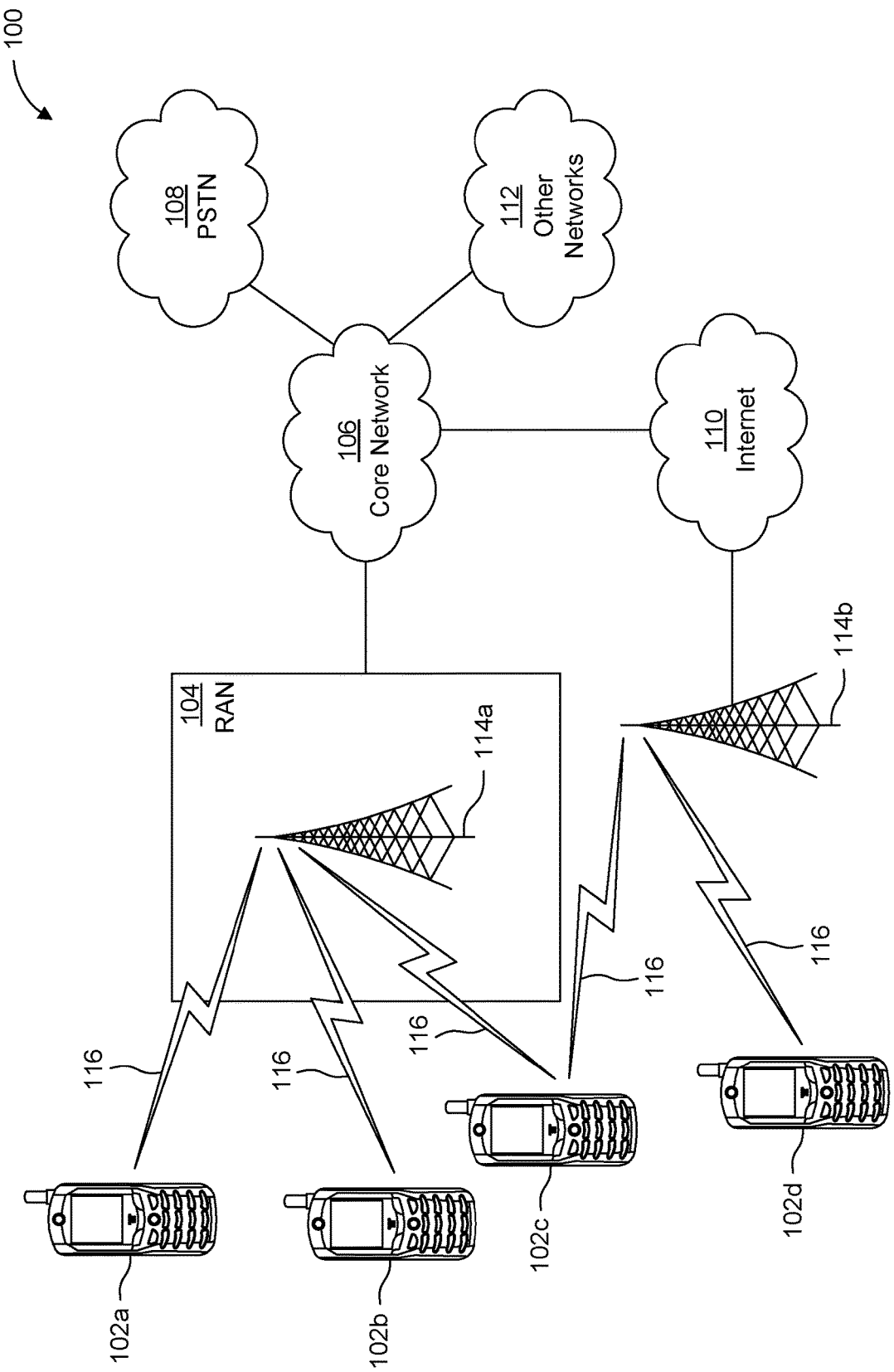
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
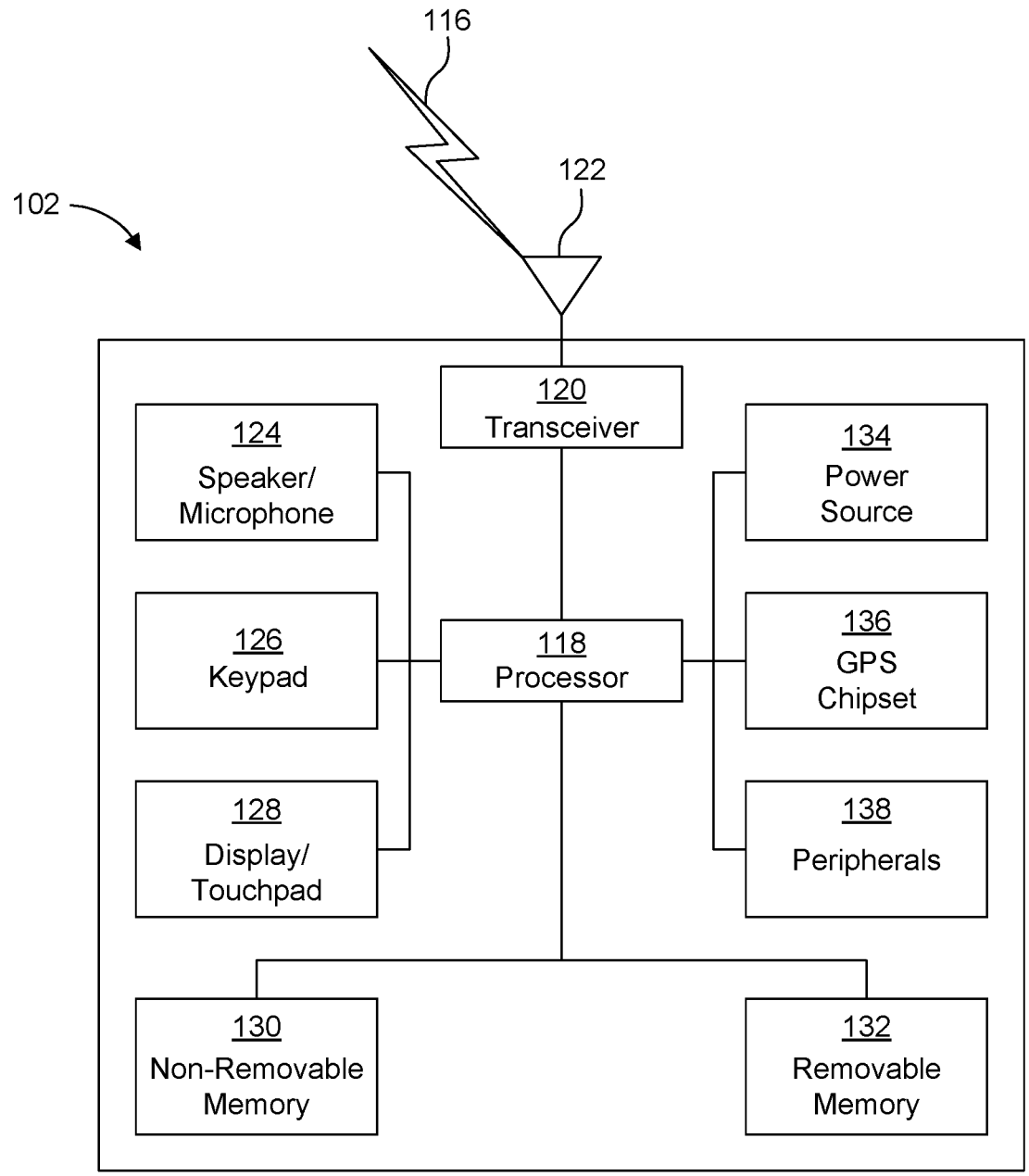
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
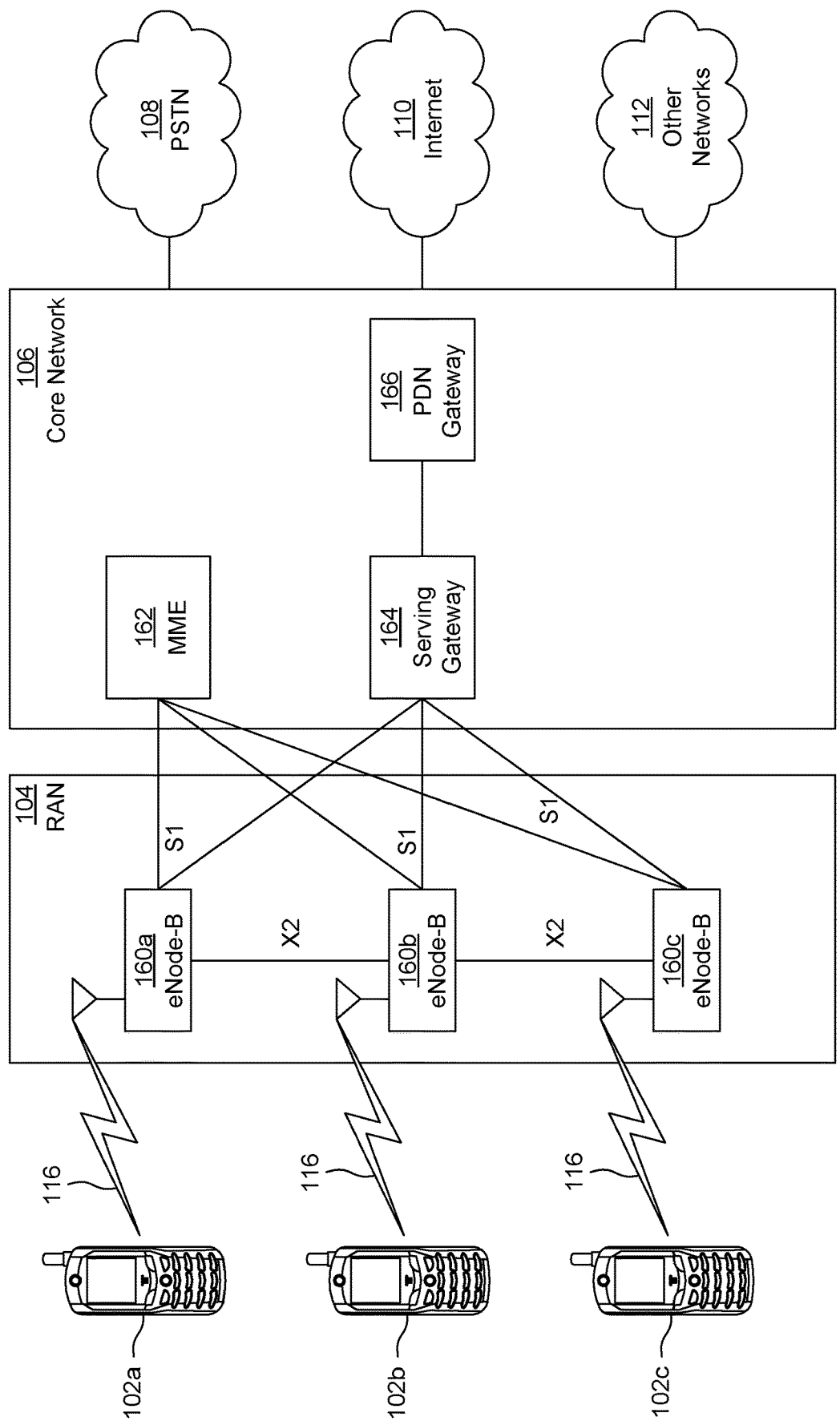
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160*a*, 160*b*, 160*c* may implement MIMO technology. Thus, the eNode B 160*a*, for example, may use multiple antennas to transmit wireless signals to, and/or receive wireless signals from, the WTRU 102*a*.

Each of the eNode Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
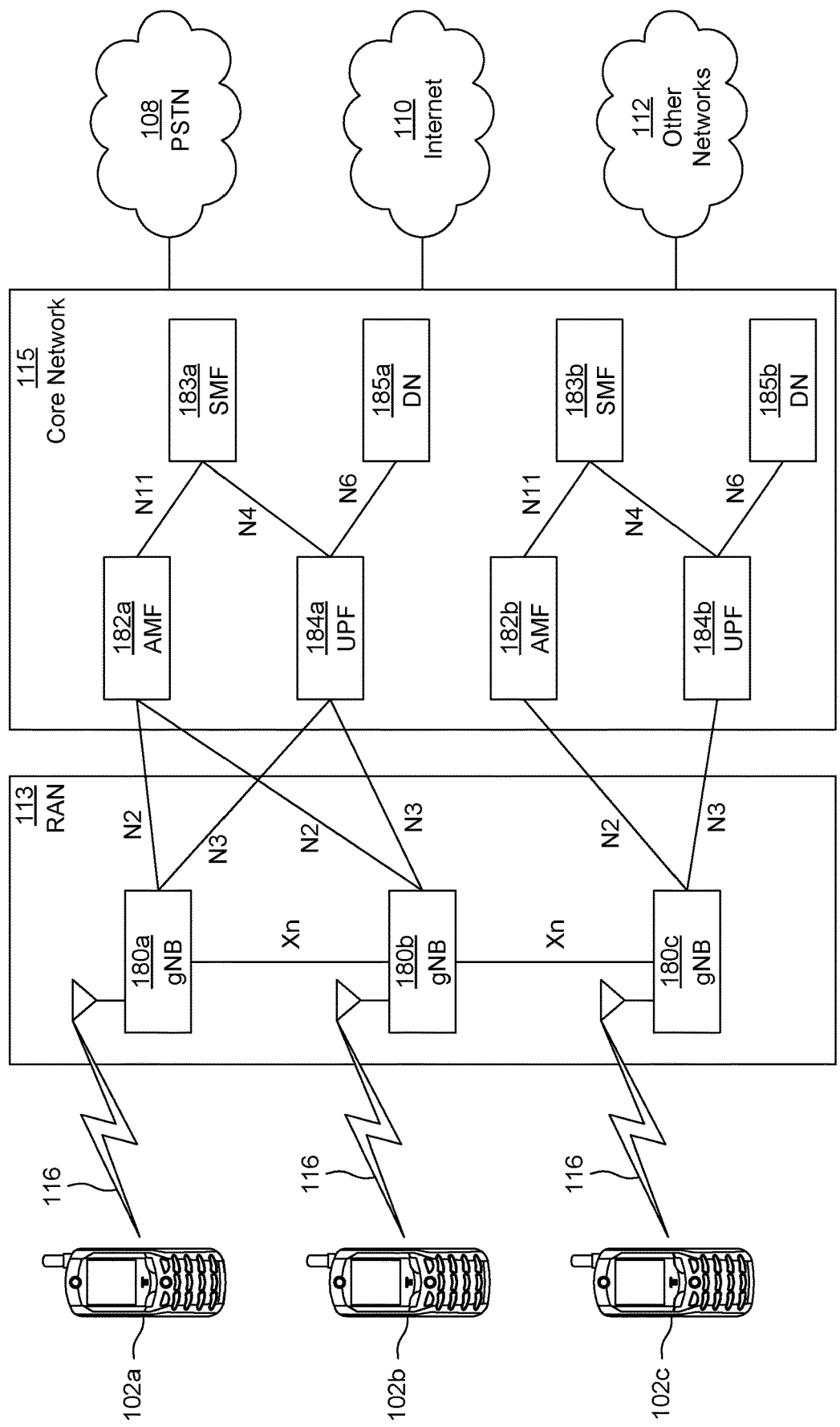
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, the gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a. A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, the WTRU 102a may receive coordinated transmissions from the gNB 180a and the gNB 180b (and/or the gNB 180c).

The WTRUs 102a, 102b, 102c may communicate with the gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with the gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with the gNBs 180a, 180b, 180c without also accessing other RANs (e.g., such as the eNode Bs 160a, 160b, 160c). In the standalone configuration, the WTRUs 102a, 102b, 102c may utilize one or more of gNBs 180a, 180b, 180c as a mobility anchor point. In the standalone configuration, the WTRUs 102a, 102b, 102c may communicate with the gNBs 180a, 180b, 180c using signals in an unlicensed band. In a non-standalone configuration, the WTRUs 102a, 102b, 102c may communicate with/connect to the gNBs 180a, 180b, 180c while also communicating with/connecting to another RAN such as the eNode Bs 160a, 160b, 160c. For example, the WTRUs 102a, 102b, 102c may implement DC principles to communicate with one or more of the gNBs 180a, 180b, 180c and one or more eNode Bs 160a, 160b, 160c substantially simultaneously. In the non-standalone configuration, the eNode Bs 160a, 160b, 160c may serve as a mobility anchor for the WTRUs 102a, 102b, 102c and the gNBs 180a, 180b, 180c may provide additional coverage and/or throughput for servicing the WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for the WTRUs 102a, 102b, 102c based on the types of services being utilized by the WTRUs 102a, 102b, 102c. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example Embodiments

Figure 2:
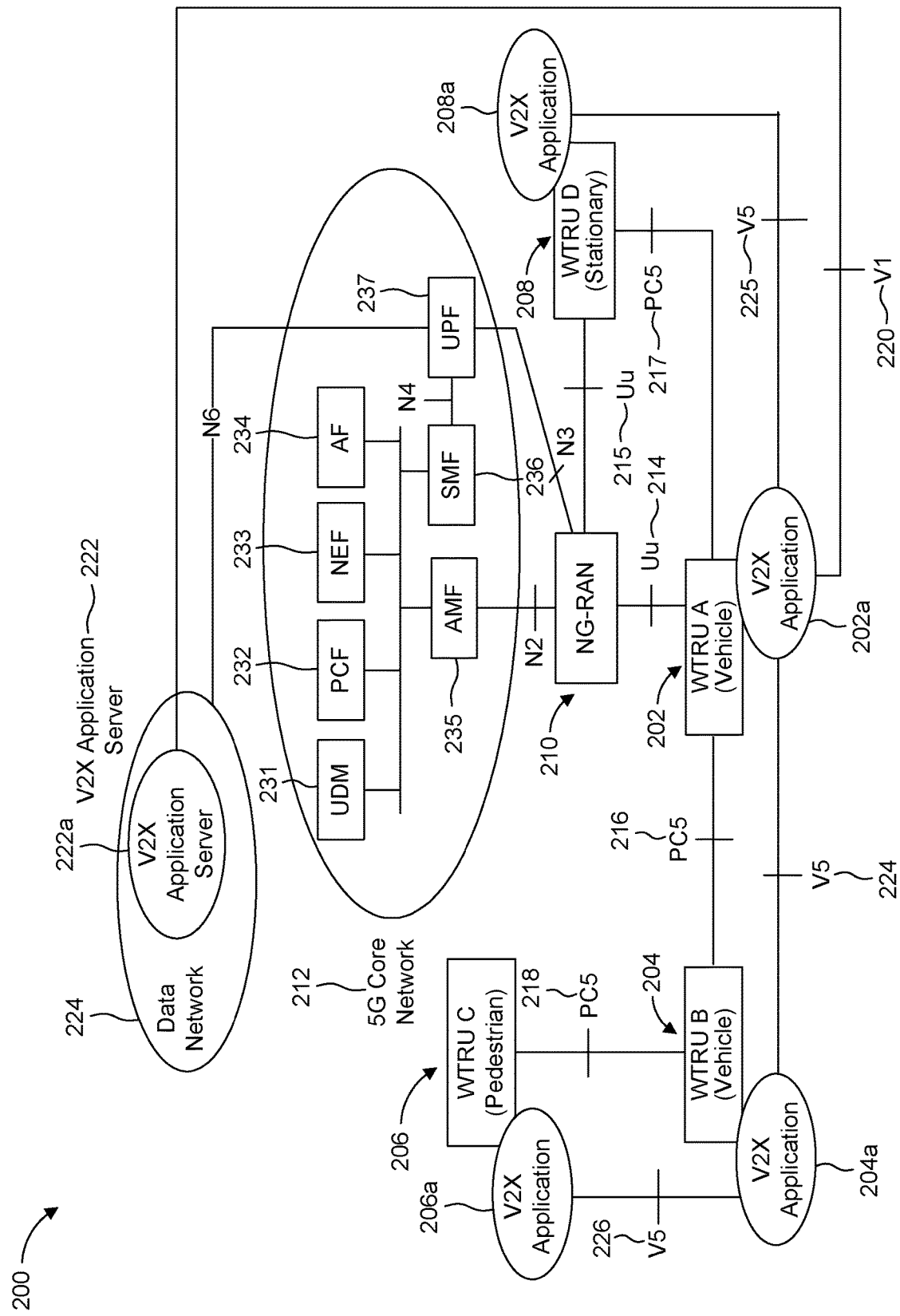
FIG. 2 is a system drawing of an example 5G environment in which embodiments of the disclosure may operate.

FIG. 2 is an example 5G system architecture 200 illustrating V2X communication. User equipment, also known as a Wireless Receive Transmit Unit, (WTRU) is shown as WTRU A (202), WTRU B (204), WTRU C (206), and WTRU D (208) as each having at least one V2X Application (202a, 204a, 206a, 208a respectively). Different applications may be identified as running on any of the WTRUs. Although a V2X application is identified in the descriptions that follow, it should be understood that more than one application may run on any WTRU. For simplicity of description, the term V2X application is used to specify the common application type that is common between multiple communicating WTRUs in FIG. 2. Each WTRU may have different application configuration parameters applied to its specific instance of a V2X application that accommodates the capabilities and/or functions of the specific WTRU involved.

Continuing with FIG. 2, in one example connection, WTRU A (202) may be a user equipment device located in a vehicle, such as a motorized vehicle used for transportation. WTRU A (202) may have a Uu reference point interface 214 to the next generation radio access Network (NG-RAN) 210 or to LTE eNB. The NG RAN 210 may connect to the 5G core network 212. In another connection example, WTRU D (208) may be a stationary user equipment device that may connect to the NG RAN 210 with a Uu reference point interface 215. Both WTRU A (202) and WTRU D (208) also have PC5 reference point interfaces (216, 217 respectively), for example which may allow connection to other user equipment. In the example system configuration of FIG. 2, WTRU A (202) can communicate with another vehicle-based user equipment WTRU B (204) via a PC5 reference point interface 216. WTRU A (202) can also communicate with the stationary WTRU D (208) via a different PC5 interface 217. Likewise, WTRU B (204) is also shown with two different PC5 reference point interfaces (216, 217); one (216) for the WTRU B (204) to WTRU A (202) communication path and one (218) for the WTRU B (204) to WTRU C (206) communication path. In the example configuration of FIG. 2, the WTRU C (206) may be a portable device located with a pedestrian. The example configuration of FIG. 2 is but one example of the many variations in user equipment interconnection possibilities.

The WTRU A (202) configuration of FIG. 2 depicts the V2X application 202a resident on the user equipment as having a V1 reference point interface 220 connection to a V2X application server (V2X AS) 222 which is depicted as being outside of the 5G core network 212. The V2X AS 222 maintains a copy of the V2X application 222a within a data network 224 that services the V2X AS 222.

In one embodiment, the V2X AS 222 can be the provisioning source for the V2X application 202a, 204a, 206a, 208a which is executed on each of the depicted user equipment devices. Also shown on FIG. 2 is the interconnection of each of the V2X applications using a V5 reference point interfaces 224, 225, 226 between various WTRU devices.

As expressed above, in one example configuration, the V2X Application Server (V2X AS) 222 may be located in a data network 224 that is usually located outside of the 5G core network 212 and may interface with V2X applications installed on the WTRUs. A V2X control function (V2X CF), not specifically shown in FIG. 2, can handle WTRU devices' authorization and provisioning (e.g. V2X policy and parameters configuration towards the WTRU). V2X CF functionality can be handled at the policy control function (PCF) of the 5G core network 212. In the V2X application, WTRU-to-WTRU communication is based on two modes of operation: over Uu reference point and/or over PC5 reference point as explained above.

The 5G core network 212 is shown in FIG. 2 as having familiar 5G functions such as unified data management (UDM) 231, policy control function (PCF) 232, network exposure function (NEF) 233, application function (AF) 234, access and mobility management function (AMF) 235, session management function (SMF) 236, and/or user plane function (UPF) 237. These functions support the overall utility of the 5G configuration with respect to the illustrated example V2X communication system 200 of FIG. 2.

The V2X communication over the PC5 reference point may be a type of ProSe Direct Communication. A one-to-one proximity service (ProSe) direct communication may be realized by, for example establishing a secure layer-2 link over PC5 between two WTRUs. In such an example, a unicast communication may be established because it involves two peer WTRUs only.

In a 5G connected system implementing a V2X application, the V2X application may have to adjust its configuration or behavior in the instance where a QoS change may occur and a new or next QoS will likely occur. Considering the requirements of enhanced V2X services, it may be important for some application(s), such as V2X applications, to be notified about a potential change in the delivered (current) QoS in advance. The advance notice may allow a dynamic adjustment to the application configuration from the 5G system connection.

In such a 5G connected system, early notifications about potential change in QoS to a WTRU and/or the application function (AF) for the expected position(s) of the WTRU in the future may be sent, allowing timely dynamic application adjustments. This may be useful, for example, for changes of level of automation in some systems. Using this solution, the 5G system collects information such as QoS Key Performance Indicators (KPIs), statistics, WTRU location, and identifies that the QoS requirements will potentially not be met and then sends a notification to the WTRU and/or AF about potential change in QoS. The V2X application may then be adjusted at the WTRU and/or AF with new parameters (e.g. changes of Level of Automation) considering the new QoS information.

The above-described 5G connected system 200 may be implemented with a closely coupled interface to the 5G system, such as a WTRU to next generation radio access network (NG-RAN) or LTE eNB using a Uu reference point interface. In such a system, the 5G Uu reference point interconnection may be used for QoS KPIs monitoring, detection of potential QoS not met conditions and sending of notification to WTRU and/or AF.

In general, it can be expected that application adjustments for V2X services may also be used and/or required when PC5 communication is used. The early detection of QoS not met conditions may be useful and/or desired when the WTRUs communicate over a PC5 interface (instead of a Uu interface). The PC5 reference point interface services the V2X application, for example by enabling communication between peer WTRUs. One such example of this communication operation is depicted in FIG. 2 in which the WTRU A 202 has a PC5 reference point interface 216 to communicate with the WTRU B 204. In the example configuration of FIG. 2, the WTRU B 204 has a PC5 reference point interface 218 to communicate with the WTRU C 206. The PC5 reference point interface supports/services the V2X application executing on a WTRU by enabling information exchange between the WTRUs connected with the PC5 interface.

It is noted that the Uu interface 214 connected directly with the NG-RAN 210 interface to the 5G system 212, whereas PC5 reference point interface communication is solely between WTRUs. That is, the PC5 reference point interface does not utilize the 5G system resources. Therefore, a solution to handle in advance potential changes in QoS conditions could be defined when WTRUs are connected via the PC5 reference point interface.

Related use cases are described herein. These use cases are provided as examples of how to apply the feature of detecting in advance that a currently experienced QoS will not be met in the future and may also include variations that will be described in detail hereinbelow.

In an embodiment, a PC5 communication between two WTRUs is established. Both WTRUs may be monitoring the QoS KPIs and can determine in advance that the currently experienced QoS on the PC5 interface will potentially not be met in the future. That is, the current QoS level on the PC5 interface may be determined as not being able to be maintained in some near-future timeframe. The two WTRUs may operate independently of each other. That is, they may run the same algorithms and may not share monitored QoS information. This first solution may be termed as Independent-WTRUs.

In another embodiment, one of the WTRUs is designated as being in charge of detecting if the currently experienced QoS will potentially not be met in the future. In this related embodiment, the WTRU detecting this condition may inform its peer WTRU which then may, for example, react as described in the first solution when the QoS not met condition is detected. This second solution, having some common aspects from the first solution may be termed as Collaborating WTRUs.

Figure 3:
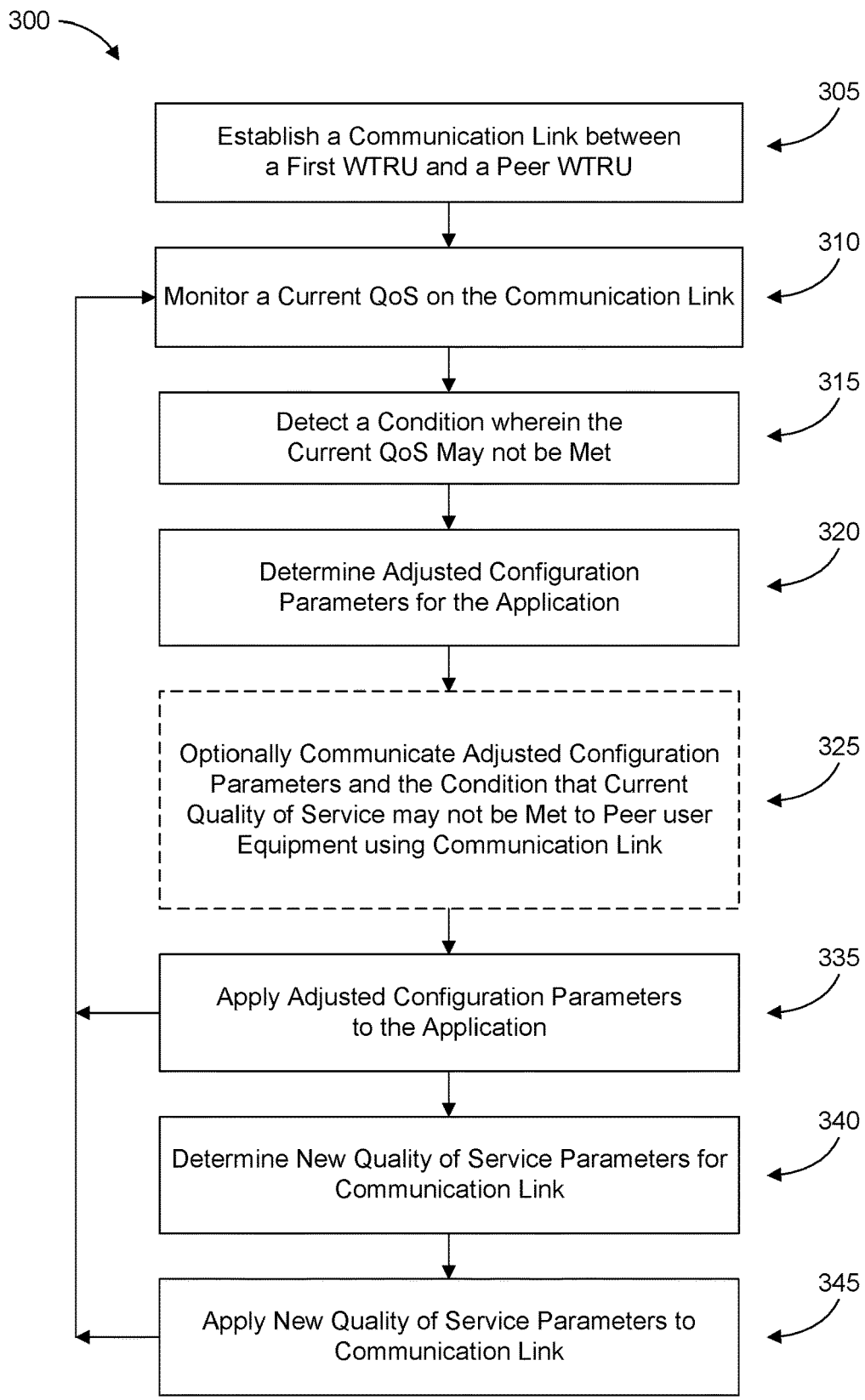
FIG. 3 is an example flow diagram illustrating a method according to a disclosure general embodiment.

FIG. 3 depicts a flow diagram 300 of an example method according to a general embodiment. At operation 305, a communication link between a first user equipment or WTRU and a peer WTRU is established. One example is the establishment of a PC5 link between the first WTRU and the peer WTRU. Operation 305 may be (e.g., may only) be performed once and then the method 300 may be exercised without repeating operation 305 unless the communication link is lost (e.g., a radio link failure occurs). In operation, the communication link services an application running on at least the first WTRU. In one example, the application is a V2X application.

At operation 310, the first WTRU may monitor a current QoS on the established communication link. In one example, the monitoring may include comparing QoS performance indicators with thresholds. At operation 315, a condition may be detected where the current QoS on the communication link may not be met at some future time. An indication of the detection, for example a potential QoS not met condition indication, may be sent to the application which may also be in the first WTRU. The indication (e.g., potential QoS not met condition indication) may be generated at the higher V2X layer and may be delivered to the V2X application, for example all within the first WTRU.

At operation 320, adjusted configuration parameters for the V2X application may be determined. In an embodiment as will be described in more detail below, the determination of the V2X application adjustment parameters can be obtained from a server or may be obtained locally within the first WTRU. The monitoring of the current QoS can occur at a higher application layer by monitoring the details of the first WTRUs access stratum layer which may handle the communication link.

Operation 325 is optional. Operation 325, shown in dashed lines, may not be used in the instance where all WTRUs are operating in the Independent WTRU mode (e.g., where all WTRUs have a monitor role) to be described in more detail in the embodiment below. Operation 325 may be invoked in the instance where some peer WTRUs are working in a collaborating role. In either event, Operation 335 may apply the adjusted configuration parameters to the application. The adjusted configuration parameters may enable the application, such as a V2X application, to adapt its behavior to accommodate the new QoS that will be soon (e.g., predicted) to occur.

At operation 340, new QoS parameters may be determined. The new QoS parameters can be obtained from a server or may be obtained locally within the first WTRU. The new QoS parameters for the communication link are based on the adjusted application configuration parameters for the V2X application. At operation 345, the new QoS parameters may be applied to the communication link to enable the new QoS. In some embodiments, operations 320 and 340 may be combined. It should be also noted that the method 300 may flow from operation 310 to operation 340 and back to 310 and/or flow from operation 310 to operation 345 and back to 310.

Embodiments of the method of FIG. 3 or a user equipment apparatus configured to implement the method of FIG. 3 may also include one or more of the following features, alone or in any combination:

The WTRU collects history/context information from the peer WTRU.
The WTRU sends "potential QoS not met" indication to the V2X application and/or the peer WTRU.
The V2X application on WTRU sends "potential QoS not met" indication to the V2X application server, with optionally the obtained QoS parameters, e.g. a current bit rate etc., or prediction of the QoS which can be met.
The V2X application receives new eV2X application configuration parameters from V2X application server.
The WTRU receives new QoS requirements for the ongoing PC5 communication.
The WTRU configures its peer WTRUs with the new configuration parameters and/or new QoS requirements.
The WTRU re-configures the PC5 link with the new QoS parameters using PC5 signalling, e.g., by performing the PC5 link modification procedure.
The WTRU re-configures the AS resources/parameters/transmission characteristics for the new targeted QoS. Such configuration may be obtained via a mapping table/profile or pre-configuration in the AS or upper layers.
The WTRU is provisioned with a role enabling or disabling the QoS monitoring.
The WTRU is provisioned with a "QoS-to-configuration parameters" mapping table, per application, which enables the WTRU to quickly react to potential QoS not met detection.
The WTRU is provisioned with historical/context information for in advance QoS not met detection.
The WTRU maintains historical/context information, e.g. the WTRU keeps history of QoS conditions with geographical location, time of the day, etc. to be used to predict/estimate, in advance, the QoS that will be obtained.

Figure 4:
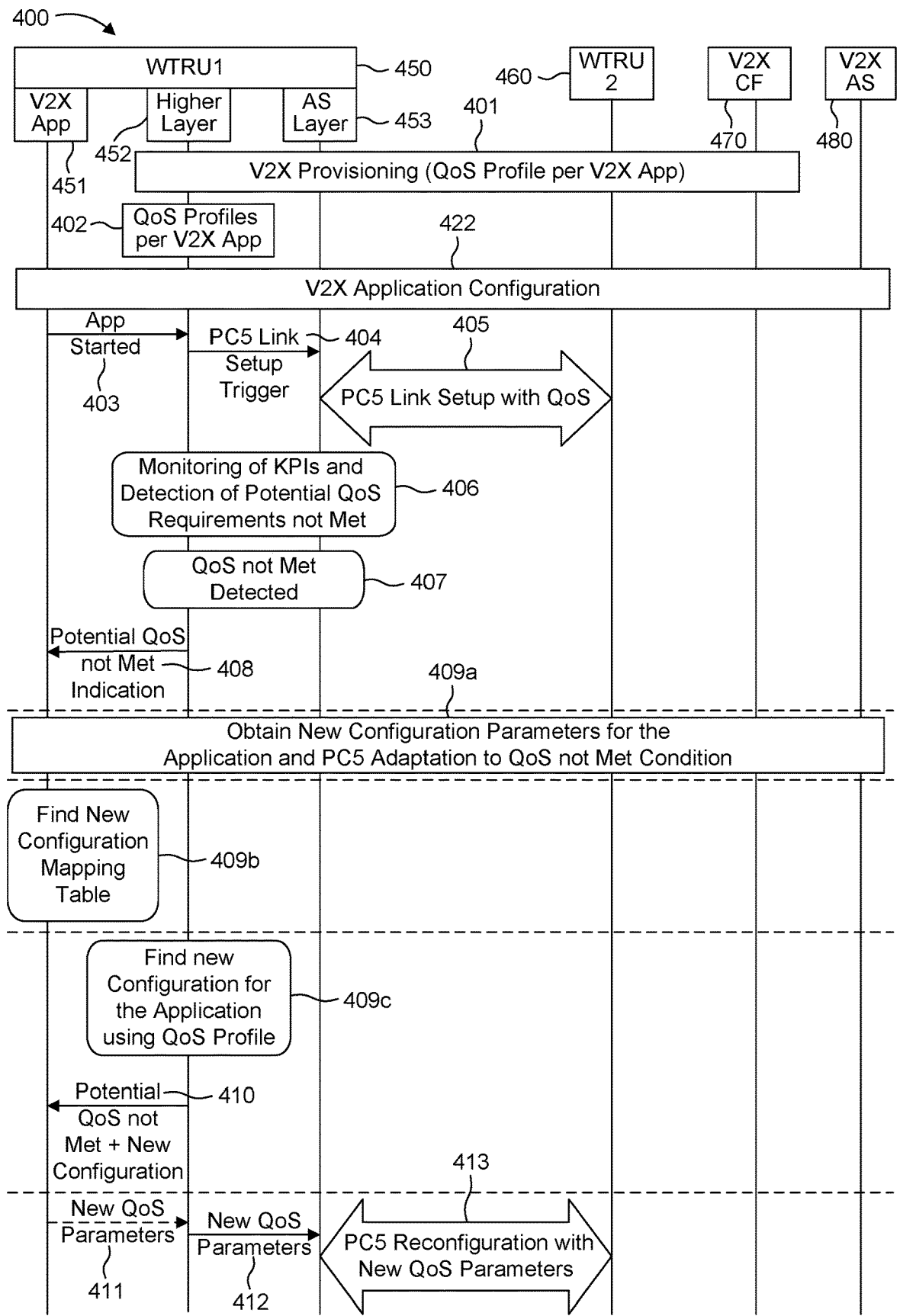
FIG. 4 is an example signal diagram illustrating an example technique according to an embodiment.

FIG. 4 is a signal diagram 400 depicting an example of a first technique to address a condition in which a QoS may not be met. Each WTRU in the configuration may monitor the QoS between itself and another WTRU, perform the QoS determination, and inform its running application if such a condition is determined. In one example, any of the WTRUs of FIG. 2 can perform the method illustrated in FIG. 4.

FIG. 4 depicts communication exchanges between or among WTRUs (e.g., a first WTRU (WTRU1 450) a second WTRU (WTRU2 460), a V2X CF 470 and a V2X AS 480. As described above, the V2X application may be in each WTRU. The V2X CF 470 can be co-located with the PCF. The WTRU1 450 of FIG. 4 is shown having the V2X application 451, a higher layer 452, also termed a V2X layer, and an access stratum (AS) layer 453. In the V2X WTRU configuration of FIG. 4, each WTRU may be running independently from other WTRUs. Each WTRU performs its own monitoring and determination of whether the QoS on the PC5 reference point interface is being met. At the exchange labeled 401 on FIG. 4, the V2X provisioning is contemplated to be accomplished as usual on the WTRU. The configuration may be received on the WTRU from the V2X CF 470. The provisioning may include a QoS profile per V2X application 402. This profile may include, contain, or indicate information used for the detection of potential QoS not met conditions.

A "QoS to configuration parameters" mapping table may be provisioned at the V2X layer (higher layer 452) as part of the QoS profile. This table may contain or include various QoS requirements and/or associated configuration parameters for the V2X application. Depending of the potential QoS that is expected, the associated application configuration parameters may be fetched from the mapping table and may be provided to the V2X application for a quick adaptation. This is further discussed at the exchange labeled 409c. The V2X layer (higher layer 452) of the WTRU1 450 may maintain a local copy of the QoS profile per application and may configure the AS layer 453 with this information assuming the AS layer handles the monitoring and/or potential QoS not met detection.

At the exchange labeled 422 on FIG. 4, the V2X AS may configure the V2X application via a direct interface to the V2X Application running on the WTRU via the V1 reference point interface as shown on FIG. 2 for the WTRU A type of configuration. A "QoS to configuration parameters" mapping table may be provisioned and saved locally at the application level. As is well understood by those of skill in the art, the above described configuration is not the only method of provisioning and/or configuring the V2X application on a WTRU.

At the exchange labeled 403 on FIG. 4, a PC5 reference point interface communication may be setup 404 with the peer WTRU, such as between WTRU A and WTRU B of FIG. 2. The QoS parameters for the PC5 link may be exchanged 405. Examples of QoS parameters may include QoS Flow Identity (QFI), 5G QoS indicator (5QI), Vehicle QoS Indicator (VQI), transmission range, and the like during the link setup.

If the V2X layer has not received the QoS profile at exchange 401, the application may send the QoS profile to the local V2X layer. The QoS parameters may be defined per application, for example since not all V2X applications have the same requirements for all WTRUs. The QoS parameters may be used for the AS configuration of the PC5 link (e.g., for configuration of resources, and/or transmission parameters, etc.), for example by or using a QoS to AS parameter mapping. This mapping may be accomplished via a profile configured by the AS layer or the upper layers, such as the V2X layer (higher layer).

A WTRU may collect history and context information. History and context information may be provisioned on the WTRU as part of the V2X provisioning. History and context information may include geographic location, time of day, obtained QoS at that location and time, and the like. This information may be stored by the WTRUs and can be used to predict, in advance, a QoS that may be obtained in the future. At the exchange labeled 406 on FIG. 4, once the PC5 link is setup, the WTRU1 may start monitoring the QoS KPIs on this specific link (PC5) to detect, in advance, if the QoS may potentially not be met. More details about a potential QoS not met determination is discussed hereinbelow. An example of this type of monitor may be a guaranteed bit rate (GBR) QoS flow. For example, the WTRU1 may detect if the GBR requirement associated with a QFI are not being met.

At the exchange labeled 407 on FIG. 4, the WTRU has determined that the QoS will potentially not be met soon (in the near future, or within a threshold period). If the AS layer has detected this condition, the AS layer may inform the V2X layer (higher layer 452). The AS layer may provide further information about which QoS aspect (e.g., latency, rate, and/or range, etc.) that cannot be met with the indication to the V2X layer that the current QoS may not be met and/or maintained. The V2X layer, at 408, may inform the local V2X application 451 which is using this PC5 link that the QoS will potentially not be met. The V2X layer (higher layer 452) may specify which QoS value is expected to be obtained. For example, the V2X layer may specify a new QoS value using a category. Other embodiments for the WTRU1 response to the QoS not met determination are described below. Any or a combination of these embodiments may be used. For example, the V2X layer can use the mapping table to find the new parameters for the application and new QoS parameters as in option 409c and 410. Then, if no mapping is found, an indication may be sent to the application layer that fetches the V2X AS and option 409a may be applied.

In the option labeled 409a in FIG. 4, the V2X application 451 may forward the QoS not met determination and the indication to the V2X AS 480 and may specify the expected QoS value/category. Optionally, the potential QoS not met indication sent to the V2X AS 480 may include the obtained QoS parameters, such as the current bit rate, and/or a prediction of the QoS which can be met. The V2X application server 480 may reconfigure the V2X application 451 with different QoS parameters. The V2X AS may send new V2X application configuration parameters as soon as (e.g., after) the V2X AS receives such an indication or the V2X AS may wait for an indication from the other WTRU (WTRU2 460) involved in the PC5 communication and may use data from both indications to determine the new application parameters for the application reconfiguration. The application dynamically adapts to the expected QoS conditions by applying these new (adjusted) V2X application parameters. The V2X application 451 may forward the new QoS configuration to the V2X layer 452. This is shown at the start of the exchange labeled 411 on FIG. 4.

The V2X application having new (adjusted) parameters may allow the V2X application configuration to modify the behavior of the V2X application for the context of the V2X application use. This behavior modification of the V2X application may accommodate an operational change resulting from the detection of the potential QoS change. One example of such a V2X configuration change is the behavior modification of the V2X application in which a potentially reduced QoS may generate and/or necessitate a change in vehicle to vehicle spacing on a highway. A lower QoS can be accommodated, for example by increasing the safety distance between vehicles until a QoS improvement occurs. Thus, an adjustment is made to at least one of the V2X application configuration parameters.

In the option labeled 409b in FIG. 4, a "QoS to configuration parameters" mapping table has been provisioned on the WTRU. This mapping table may be used to determine the configuration parameters to be used for the V2X application adaptation to the expected QoS conditions. If the table is provisioned at the V2X application layer, the application may determine the new configuration and may apply the new configuration. The V2X application may not or does not have to contact the V2X application server and/or may not wait for the new configuration parameters, for example unless no mapping is found in the mapping table. The V2X application may forward the new configuration to the V2X layer (higher layer) as was done in the option of 409a.

In the option labeled 409c in FIG. 4, the V2X layer is configured with "QoS to configuration parameters" mapping table, that is included in the QoS profile of the V2X layer (higher layer). In this case, the V2X layer may use the potential expected QoS value and the mapping table to find the application configuration parameters to be applied at the V2X application level. The V2X layer sends the V2X application configuration parameters to the V2X application layer with the "Potential QoS not met" indication 410. If no mapping is found in the mapping table, the V2X layer may fetch an updated mapping table from the V2X CF and/or may send an indication to the V2X application level to let the application obtain the new parameters.

In the exchange starting at label 411 in FIG. 4, the WTRU1 450 may reconfigure the PC5 link with the new QoS parameters using the PC5 signaling. This can be accomplished using PC5 link modification procedures. If the new QoS parameters are obtained at the V2X application level, that is, from the V2X AS or from a local mapping table in the V2X application, then at 411, the V2X application 451 may send these new QoS parameters to the V2X layer 452. At 412, the V2X layer 452 may send the new QoS parameters to the AS layer 453 of the WTRU1. The AS layer may handle the PC5 reconfiguration using the new QoS parameters at 413. The AS layer 453 can be reconfigured to accommodate the new QoS value/level with a new set of AS parameters/configuration based on the new QoS parameters. The reconfiguration of the PC5 interface may include a reconfiguration of AS layer resources/parameters/transmission characteristics for the new targeted QoS.

Figure 5A:
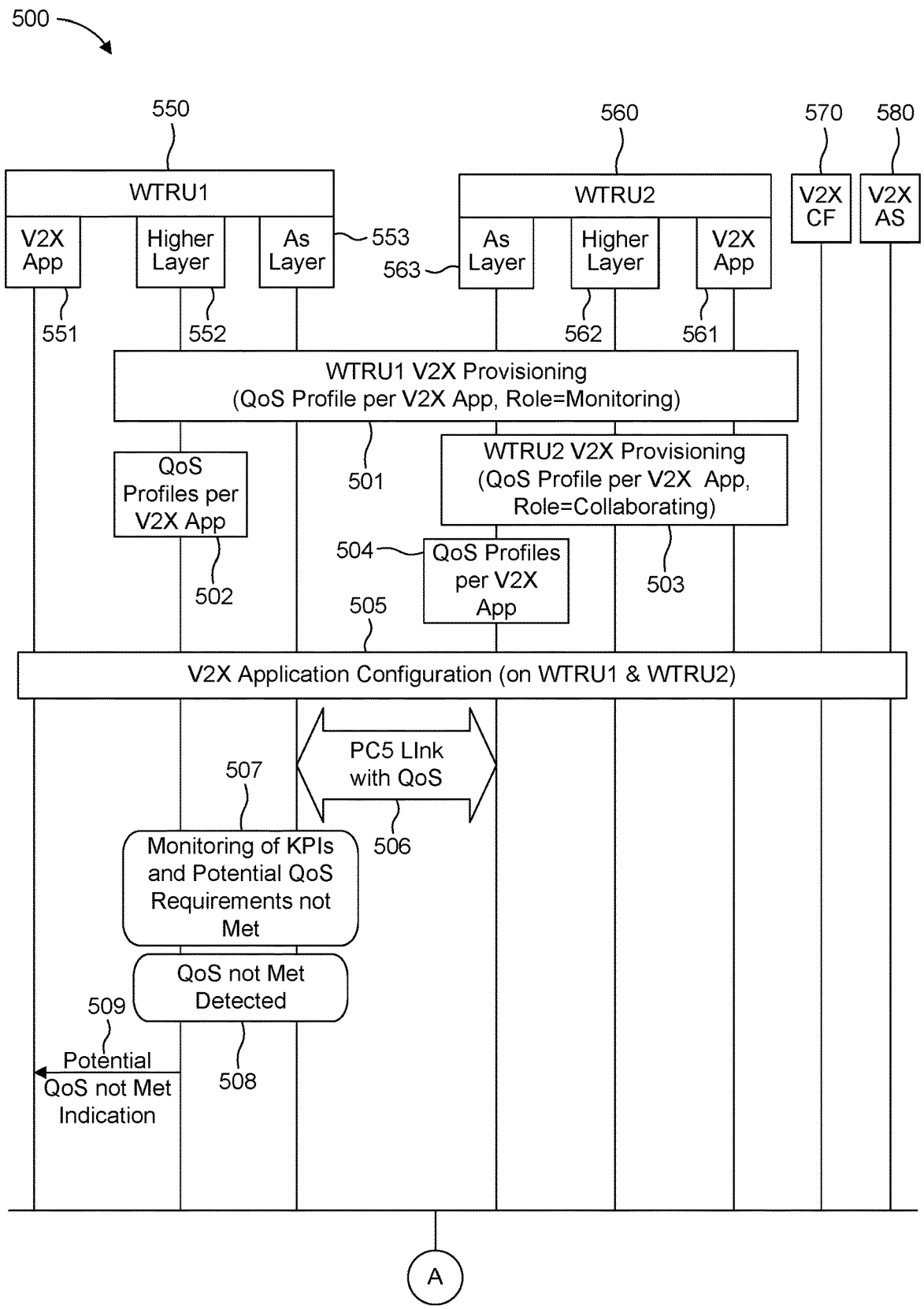
FIG. 5A is an example signal diagram illustrating another technique according to an embodiment.
Figure 5B:
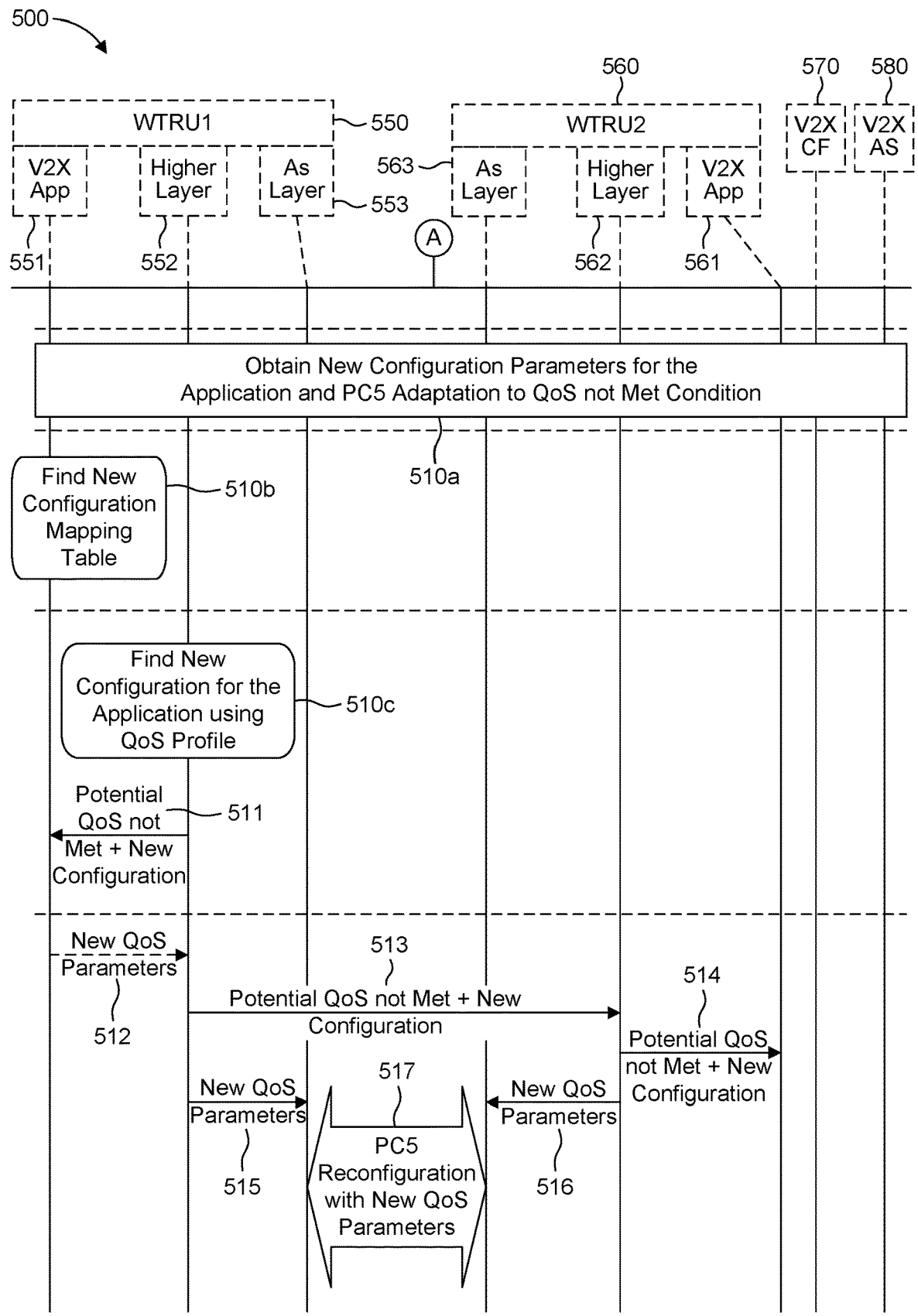
FIG. 5B is a continuation of FIG. 5A.

FIG. 5A and FIG. 5B combined form a diagram 500 that illustrates how applications on peer WTRUs may dynamically adapt their behavior when a QoS is potentially not met over the PC5 link. As described previously, FIG. 5A-5B illustrates the Collaborating WTRUs solution in which a pre-determined WTRU involved in the PC5 communication may: (1) monitor the QoS KPIs, (2) handle the QoS not met detection and, if such a condition is detected, (3) inform the local application about the potential QoS not met condition, and/or (4) inform its peer WTRU about the potential QoS not met condition and may additionally re-configure the PC5 link with new QoS parameters and a new AS configuration. The peer WTRU involved in this PC5 communication may not or does not have to perform this monitoring and potential QoS not met detection (for example as may be the case in the FIG. 4 example).

In the illustration of exchanges in the signal diagram of FIG. 5A, a WTRU1 550 is depicted as before with a V2X application layer 551, a V2X higher layer 552, and an access stratum (AS) layer 553. Likewise, WTRU2 is similarly depicted with a V2X application layer 561, a V2X higher layer 562, and an access stratum (AS) layer 563.

As for the independent WTRU solution illustrated in FIG. 4, the new V2X configuration (e.g., to be applied at the V2X application level and/or at the PC5 link) may (a) be fetched by the application from the V2X AS on each WTRU, (b) be pre-configured at the application on each WTRU, or (c) the V2X layer may be configured with a "QoS to configuration parameters" mapping table and the V2X layer may send these parameters with the potential QoS not met indication to the local application and/or to the peer WTRU. In the collaborating WTRU solution illustrated in FIGS. 5A and 5B, the monitoring WTRU 550 (WTRU1) may send the potential QoS not met indication to the peer WTRU 560 (WTRU2).

In the exchange labeled 501 in FIG. 5A, the V2X provisioning is done as usual on every WTRU. The provisioning may include a QoS profile per V2X application 502, 503, 504. This profile may include, contain or indicate information used for the detection of a potential QoS not met condition. A "role" may be configured on the WTRU that may be set to "monitoring" (e.g., for WTRU1) or "collaborating" (e.g., for WTRU2). The role may be: (1) decided and/or signaled by the V2X AS and/or an application server; and/or (2) based, for example, on the WTRU's capabilities/capacities. For example, a powerful CPU, a large amount of memory, etc. may indicate a role, as a monitoring WTRU, whereas a less powerful CPU and/or a small amount of memory resources (e.g., below a threshold) may indicate a role, as a collaborating WTRU. Upon provisioning a WTRU, its role may be established by enabling or disabling QoS monitoring.

The monitoring WTRU 550, such as WTRU1, may have the responsibility to monitor the QoS KPIs and/or determine if the QoS may potentially not be met. In this case, the monitoring WTRU is responsible of informing locally the V2X application 551 and the collaborating WTRU 560 of the determined QoS not met condition.

In the exchange labeled 505 in FIG. 5A, the V2X AS may configure the V2X application via a direct interface using the V1 reference point interface to the V2X Application running on the WTRU as shown on FIG. 2 for the WTRU A type of the configuration. A "QoS to configuration parameters" mapping table may be provisioned and/or saved locally at the application level. As is well understood by those of skill in the art, the above described configuration is not the only method of provisioning and configuring the V2X application on a WTRU1 as the monitoring WTRU 550. The WTRU2 configuration may also be accomplished via a V1 reference point interface, if the WTRU2 is so equipped. The WTRU2 V2X application 561 may be configured as a collaborating WTRU.

In the exchange labeled 506 in FIG. 5A, a V2X application 551 may be started on the WTRU1. The PC5 reference point interface communication may be setup with the peer WTRU2 (e.g., the collaborating WTRU).

In the exchange labeled 507 in FIG. 5A, once or after the PC5 reference point interface link is setup, the WTRU1 (e.g., the monitoring WTRU 550) may start monitoring the QoS on the PC5 link to detect, in advance, if the QoS may potentially not be met.

In the exchange labeled 508 in FIG. 5A, the V2X layer detects that the QoS will or is to potentially not be met. At the exchange labeled 509 in FIG. 5A, the V2X layer 552 of WTRU1 may inform the local V2X application 551, which is using the PC5 reference point interface link, with an indication that the QoS may potentially not be met. The expected QoS value/category may also be specified with the indication. As was the case with the independent WTRU solution described above, various embodiments are described hereinbelow. Any or a combination of these embodiments may be used. For example, following connector "A" of FIG. 5A to FIG. 5B, the V2X layer 552 can use the mapping table to find the new parameters for the V2X application 551 and/or new QoS parameters as in option 510c of FIG. 5B. If no mapping is found, an indication of the QoS potentially not met condition may be sent to the V2X application 551 that may contact the V2X AS 580, as in option 510a of FIG. 5B.

In more detail of option 510a of FIG. 5B, the V2X application 551 may obtain new V2X application configuration parameters from the V2X AS 580 (e.g., the application server). The expected QoS value/category information may be sent to the V2X application server 580 so that the new V2X application parameters may be selected based on that information. The V2X application 551 may dynamically adapt to the expected QoS conditions, for example by applying these new V2X application parameters. The V2X application 551 may forward the new QoS parameters to the V2X layer (higher layer) 552.

In the option labeled 510b in FIG. 5B, the application layer (V2X application) can be pre-provisioned with V2X application configuration parameters and/or can by itself determine the new application configuration to be applied. The V2X application may not or does not have to contact the V2X application server and/or wait for new V2X application configuration parameters. The V2X application may forward the new QoS parameters to the V2X layer (higher layer) as was done in the option of 510a.

In the option labeled 510c in FIG. 5B, the V2X layer 552 may be configured with a "QoS to configuration parameters" mapping table, which is included in the QoS profile at the higher layer (e.g., V2X layer 552). In this case, the V2X layer 552 may send the new V2X application 551 configuration parameters to the application with the "Potential QoS not met" indication 511.

In the exchange labeled 512 in FIG. 5B, the V2X application 551 of WTRU1 550 may send the new QoS parameters to the higher layer 552. At 513, the V2X higher layer 552 may send the potential QoS not met indication with the new V2X configuration to the collaborating WTRU2 560 V2X higher layer 562. At 513, the potential QoS not met indication may be sent to the AS layer 563 of the WTRU2 560 as a high priority message. In certain embodiments, the V2X layer 562 may interrupt communication, for example to ensure that the indication is sent over the AS layer reliably. The collaborating WTRU2 560 may send the 513 message indication with new QoS parameters to the higher layer 562 and to the V2X application 561 (See 514). At 515, 516, the new QoS parameters may be sent to the AS layer on each WTRU and the PC5 link reconfiguration at 517 with new QoS parameters may be accomplished.

The two embodiments depicted in FIGS. 4 and 5A-5B are described using a unicast PC5 communication link, however, they may be equally applied to multicast communication as well. The Independent WTRUs solution of FIG. 4 may easily be applied, for example since all independent WTRUs are detecting potential QoS not met conditions and applying new configuration to adapt to the QoS conditions.

The collaborating WTRUs solution of FIG. 5A-5B, may be supported using multicast communication. In this case, a WTRU in the multicast group may be selected as the "monitoring" WTRU and the other WTRUs (e.g., all other WTRUs) in the multicast group may be configured as "collaborating" WTRUs. The monitoring WTRU may multicast to all its peer WTRUs, over the PC5 link, the potential QoS not met condition and/or may provide to all these WTRUs the new configuration parameters to be applied. This solution has the advantage of limiting the fetching of new configuration from the V2X AS when a potential QoS not met condition is detected since only the monitoring WTRU may have to access the V2X AS. Some WTRUs may have limited capabilities (e.g., power or CPU processing capabilities) that may limit their responsibilities to a collaborating WTRU role. In the instance of WTRUs having limited capabilities, the collaborating role may be appropriate and/or preferable and may enable usage of the limited capability WTRUs.

In a further application of the collaborating WTRUs, a very large group of WTRUs registered in a multicast communication using a PC5 link is contemplated. In this case, it may be more efficient to designate more than one WTRU as monitoring WTRUs. The group of participating WTRUs may be split into smaller groups with each of these smaller groups handled by a specific monitoring WTRU. All monitoring WTRUs may exchange their findings and then a main monitoring WTRU (e.g. master/leader monitoring WTRU) or the group of monitoring WTRUs may multicast the potential QoS not met indication with new V2X application's specific configuration parameters to the collaborating WTRUs.

As described above with respect to FIGS. 4 and 5A-5B, a potential QoS not met determination/detection is made by a WTRU and may serve as the trigger for obtaining new V2X application parameters and/or the determination of a new proper QoS level to apply to the PC5 reference point interface. This determination/detection may be performed by the V2X layer (higher layer) and/or the AS layer of the monitoring WTRU.

In one example, the determination/detection of a potential QoS not met indication can be performed by the WTRU, if the WTRU is provisioned with key performance indicators (KPIs) to be monitored and with various thresholds. The WTRU may be provisioned with context and/or historical information regarding the WTRU's behavior. Such context and/or historical information may include geographical location, running applications, the day, the time of day, velocity, distance to other WTRUs, and the like.

The WTRU may monitor key performance indicators (KPIs) over the PC5 link, such as, for example, payload (bytes), transmission rate (message/sec), maximum end-to-end latency (ms), reliability (%), data rate (Mbps) or Prioritized Bit Rate (PBR), minimum required communication range (meters), error rate (e.g., Packet Error Rate (PER)), retransmission rate, signal to noise/interference ratio, % available time of PC5 resources and the like.

Using context, historical, KPI, and/or the thresholds, the WTRU may determine if the QoS is potentially not going to be met. Such thresholds may be configured by the upper layers, via signaling, by the AS itself, such as, for example, by a gNB or through pre-configuration of a WTRU.

Provisioning on a monitoring WTRU at the V2X layer from the V2X CF may include some or all of the following items: (1) requested QoS per PC5 link information, (2) a mapping table of QoS to configuration parameters, (3) a priority table for applications, if more than one application is to be run on the WTRU, and/or (4) a WTRU's context/history information which may include geographic location, time, obtained QoS, and the like.

Provisioning of a WTRU which can function as a monitoring WTRU in the collaborating WTRU configuration may include the same or a subset of the monitoring WTRU provisions set forth above plus a role parameter to be set as either monitoring or collaborating. Also included may be the feature to set up sub-groups. A group/sub-group identifier may be used by the monitoring WTRUs/main monitoring WTRU to multicast information related to the QoS potentially not met indication. A subgroup identifier may be used for QoS reconfiguration parameters and/or by collaborating WTRUs to listen for such information.

WTRUs operating with independent WTRU functionality or collaborating WTRU functionality may be provisioned with a QoS configuration parameter mapping table. This item may also be located in the QoS Profile for an V2X layer. The "QoS-to-configuration parameters" provisioned at the WTRU may be used to determine the appropriate configuration parameters to be applied at the application level to adapt its behavior considering the potential and/or actual QoS obtained. This table may be provisioned on the WTRU as part of the QoS profile.

The QoS profile may include or contain QoS related parameters, for example to define the QoS KPIs of interest, the timing, the geographical location and/or the triggering conditions for the notification about potential change in QoS. The "QoS-to-configuration parameters" mapping table may contain for example, the application identifiers, the obtained and/or expected QoS and/or the configuration parameters to be applied by the application. Different applications may be identified as running on the WTRU, and/or an application identifier may be used to assist in differentiating the different QoS requirement that is expected for different conditions for the different applications.

The obtained and/or expected QoS may be categorized using such terms as "very good", "good", and "bad", for example. Other rating schemes/categories are possible. Each category is defined by thresholds. For example, if one or more observed QoS KPIs are below the threshold for the "good" category, a QoS selection may move down to the next category, such as "bad" in this example. The V2X layer may not or does not understand the configuration parameters, for example since the configuration parameters may be specific to each application. The V2X layer may acquire the configuration parameters for the application from the mapping table and may send the configuration parameters to the application which may interpret them appropriately.

Table 1 gives an example of what may be contained in the QoS to Configuration Parameter Mapping Table. Note that numbers specified are only shown as examples and may not be the actual numbers that could be used. As stated above, configuration parameters are specific to the application provisioned on a specific WTRU. Thus, for example, different types of WTRUs from different manufactures having different capabilities may have different QoS to configuration parameter mapping tables. Table 1 depicts a mapping table for one application whose ID is 100. Other applications running on the WTRU may have different mappings.

TABLE 1

QoS to Configuration Parameter Mapping Table

| Application ID | Expected QoS category | Thresholds | Application Configuration Parameters | QoS Parameters |
|---|---|---|---|---|
| 100 | Very good | Latency < 3 ms | Level of Automation = high, distance between WTRUs = small | Tx Range = short |
|  | Good | 3 ms ≤ Latency ≤ 7 ms | Level of Automation = medium, distance between WTRUs = medium | Tx Range = medium |
|  | Bad | 7 ms < Latency | Level of Automation = low, distance between WTRUs = high | Tx Range = long |

As seen in Table 1, using latency as an example KPI, an existing and operating latency of between 3 ms and 7 ms is considered a "good" QoS category. If a detection/determination is made that the latency is or worsens to be greater than 7 ms, it may be expected that a QoS for application 100 may be at or move to the "bad category. In this condition, the WTRU would detect a QoS potentially not met condition and generate a QoS potentially not met indication. The mapping table provides the application configuration parameters and the QoS parameters, for example may accommodate a change of QoS in application 100. The application configuration in this example indicates a distance between WTRUs as being "high" and the example QoS parameter to indicate a transmission range set to "long" to be able to reach the WTRUs using this new configuration.

In a complementary embodiment, the V2X layer may inform the local application when the QoS is improving after a potential QoS not met indication (for example, returning from a latency in the "bad" QoS category to a latency in the good QoS category). In this instance, QoS parameters may be modified to return to (e.g., go back to) the original configuration. Again, the application may query the application server for new parameters or new parameters may be already provisioned on the WTRU. The V2X layer may inform the peer WTRU(s), such as the V2X layer on a peer WTRU, about a QoS improving condition. In this instance, the V2X layer receiving this indication passes it to the local application. As a result, the WTRU may re-configure the PC5 link again with new, and now improved, QoS parameters to take advantage of the available conditions and may reconfigure the application accordingly.

A WTRU, such as WTRU A 202 shown in FIG. 2, may accommodate multiple transceivers, for example as disclosed herein similar to transceiver 120 of FIG. 1B. The multiple transceivers may enable the WTRU to communicate over multiple link paths as indicated by the WTRU A configuration of FIG. 2. For example, the WTRU A may have the transceiver resources to transmit and/or receive using at least one PC5 reference point interface, at least one Uu reference point interface, at least one V5 reference point interface, and/or at least one V1 reference point interface.

The example WTRU can have all or a subset of these transceivers as determined by the context of the use as is understood by one of skill in the art. More than one instance of the transceiver types may be implemented in a WTRU. The example WTRU may have all or a subset of the features of FIG. 1B include one or more of a processor 118, transceivers 120, speaker/microphone 124, keypad 126, display/touchpad 128, peripheral 138, GPS chipset 136, and other items such as a power source 134. In any configuration of the WTRU for a specific context of use compatible with the current disclosure, the processor of the WTRU may be configured to provide processing services and transceiver resources to accomplish the exchanges set forth in the examples of FIGS. 4 and 5.

Each of the contents of the following references is incorporated by reference herein:
(1) 3GPP TS 23.786 v0.9.0, Study on architecture enhancements for EPS and 5G System to support advanced V2X services, Release 16; and
(2) 3GPP TS 23.303 v15.0.0, Proximity-based Services (ProSe), Release 15.

The innovative principles described hereinabove provide practical applications using a unique combination of elements to address a problem in V2X communications where a quality of service (QoS) change is needed in a PC5 reference point interface between multiple WTRUs executing a V2X application.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements.

The present disclosure is not to be limited in terms of the particular embodiments described in this application, which are intended as illustrations of various aspects. Many modifications and variations may be made without departing from its scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mate-able and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, paragraph 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra-Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable storage medium as instructions for execution by a computer or processor to perform the actions described hereinabove. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a monitoring Wireless Transmit/Receive Unit, WTRU, having a PC5 communication link with a peer WTRU, the method comprising:
monitoring, by the monitoring WTRU, current quality of service, QoS, information of the PC5 communication link with the peer WTRU;
detecting a condition wherein the current QoS may not be met in a future time;
determining, by the monitoring WTRU, new QoS parameters;
communicating an indication of the detected condition and the new QoS parameters to the peer WTRU using the PC5 communication link;
reconfiguring the PC5 communication link using the new QoS parameters.

2. The method of claim 1, wherein monitoring current QoS information is performed by monitoring QoS key performance indicators.

3. The method of claim 1, wherein determining the new QoS parameters comprises:
determining the new QoS parameters from a mapping table of the monitoring WTRU.

4. The method of claim 1, wherein determining the new QOS parameters comprises:
determining the new QoS parameters using a QoS profile of the monitoring WTRU.

5. The method of claim 1, wherein reconfiguring the PC5 communication link using the new QoS parameters comprises transferring the new QOS parameters to an access stratum layer of the monitoring WTRU to reconfigure the PC5 communication link with the peer WTRU.

6. The method of claim 1, wherein detecting a condition wherein the current QoS may not be met comprises monitoring the current QoS information and executing a vehicle to everything application that communicates using at least one of unicast transmissions or multicast transmissions.

7. The method of claim 1, wherein determining new QOS parameters comprises determining at least one of a QoS flow identity, a QoS indicator, a vehicle QoS indicator, or a transmission range.

8. A wireless transmit/receive unit, WTRU, comprising circuitry including a transmitter, a receiver, a processor, and memory, the WTRU configured to:
monitor current quality of service, QOS, information of a PC5 communication link with a peer WTRU;
detect a condition wherein the current QoS may not be met in a future time;
determine, by the WTRU, new QoS parameters;
communicate an indication of the detected condition and the new QoS parameters to the peer WTRU using the PC5 communication link;
reconfigure the PC5 communication link using the new QoS parameters.

9. The WTRU of claim 8, wherein the processor monitors the current QoS information by monitoring QoS key performance indicators.

10. The WTRU of claim 8, wherein the WTRU reconfigures the PC5 communication link by transferring the new QoS parameters to an access stratum layer of the WTRU to reconfigure the PC5 communication link with the peer WTRU.

11. The WTRU of claim 8, wherein the WTRU detects the condition that the current QoS may not be met by monitoring the current QoS information and executing a vehicle to everything application that communicates using at least one of unicast transmissions or multicast transmissions.

12. A non-transitory computer-readable storage device embodying instructions which, when executed by a monitoring wireless transmit/receive unit, WTRU, cause the WTRU to carry out the method of:
monitoring, by the monitoring WTRU, current quality of service, QoS, information of a PC5 communication link with a peer WTRU;
detecting a condition wherein the current QoS may not be met in a future time;
determining, by the monitoring WTRU, new QoS parameters;
communicating an indication of the detected condition and the new QoS parameters to the peer WTRU using the PC5 communication link;
reconfiguring the PC5 communication link using the new QoS parameters.

13. The non-transitory computer-readable storage device of claim 12, wherein detecting the condition wherein the current QoS may not be met comprises monitoring the current QoS information and executing a vehicle to everything application that communicates using at least one of unicast transmissions or multicast transmissions.

14. The non-transitory computer-readable storage device of claim 12, wherein monitoring current QoS information is performed by monitoring QoS key performance indicators.

15. The non-transitory computer-readable storage device of claim 12, wherein determining the new QoS parameters comprises:
determining the new QoS parameters from a mapping table of the monitoring WTRU.

16. The non-transitory computer-readable storage device of claim 12, wherein determining the new QoS parameters comprises:
determining the new QoS parameters using a QoS profile of the monitoring WTRU.

17. The non-transitory computer-readable storage device of claim 12, wherein reconfiguring the PC5 communication link using the new QoS parameters comprises transferring the new QoS parameters to an access stratum layer of the monitoring WTRU to reconfigure the PC5 communication link with the peer WTRU.

\* \* \* \* \*